(12) United States Patent
Li et al.

(10) Patent No.: US 10,929,477 B2
(45) Date of Patent: Feb. 23, 2021

(54) ENVIRONMENT INFORMATION STORAGE AND PLAYBACK METHOD, STORAGE AND PLAYBACK SYSTEM AND TERMINAL

(71) Applicant: JRD COMMUNICATION (SHENZHEN) LTD, Guangdong (CN)

(72) Inventors: Xin Li, Guangdong (CN); Yu Zheng, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 110 days.

(21) Appl. No.: 16/309,448

(22) PCT Filed: May 10, 2017

(86) PCT No.: PCT/CN2017/083695
§ 371 (c)(1),
(2) Date: Dec. 12, 2018

(87) PCT Pub. No.: WO2018/018990
PCT Pub. Date: Feb. 1, 2018

(65) Prior Publication Data
US 2019/0311007 A1 Oct. 10, 2019

(30) Foreign Application Priority Data
Jul. 29, 2016 (CN) .......................... 201610613484.6

(51) Int. Cl.
*G06F 16/22* (2019.01)
*G06F 16/909* (2019.01)
*G06F 16/901* (2019.01)
*G06F 16/23* (2019.01)

(52) U.S. Cl.
CPC ........ *G06F 16/909* (2019.01); *G06F 16/2365* (2019.01); *G06F 16/901* (2019.01)

(58) Field of Classification Search
CPC .................................. G06F 11/08; G06F 11/14
USPC .................................................. 707/690, 711
See application file for complete search history.

(56) References Cited

U.S. PATENT DOCUMENTS

2006/0239648 A1    10/2006  Varghese
2007/0047901 A1*   3/2007   Ando ................... G11B 27/105
                                                       386/241
2008/0203315 A1    8/2008   Kasama
2011/0211808 A1*   9/2011   Ryu ..................... G11B 27/105
                                                       386/234

(Continued)

FOREIGN PATENT DOCUMENTS

CN    102081657 A    6/2011
CN    104008212 A    8/2014

*Primary Examiner* — Alexandria Y Bromell

(57) ABSTRACT

An environment information storage and playback method, a storage and playback system, and a storage and playback terminal are disclosed. The storage and playback method may include: acquiring current position data and time data (S101); collecting current environment data (S102); establishing a first association between the environment data and the position data, and establishing a second association between the environment data and the time data (S103); storing the position data, the time data, the environment data, the first association, and the second association (S104). The present storage and playback method could store the current environment data based on position and time.

17 Claims, 2 Drawing Sheets

(56) References Cited

U.S. PATENT DOCUMENTS

| | | | |
|---|---|---|---|
| 2012/0128322 A1* | 5/2012 | Shaffer | G11B 20/10527 |
| | | | 386/241 |
| 2013/0024211 A1* | 1/2013 | Monteforte | G06Q 30/00 |
| | | | 705/3 |
| 2013/0084054 A1* | 4/2013 | Ohashi | H04N 21/4402 |
| | | | 386/241 |
| 2013/0346523 A1 | 12/2013 | Praun et al. | |
| 2014/0118143 A1* | 5/2014 | Monacos | G08B 21/02 |
| | | | 340/539.13 |
| 2014/0309790 A1* | 10/2014 | Ricci | G01C 21/3697 |
| | | | 700/276 |
| 2015/0074079 A1* | 3/2015 | Kotha | G06F 16/9535 |
| | | | 707/711 |
| 2015/0163206 A1* | 6/2015 | McCarthy | G06F 21/10 |
| | | | 713/171 |
| 2015/0199433 A1* | 7/2015 | Yang | G06F 16/2228 |
| | | | 707/711 |
| 2016/0125307 A1 | 5/2016 | Zheng et al. | |
| 2016/0183351 A1* | 6/2016 | Snyder | H04L 12/2818 |
| | | | 315/152 |
| 2017/0091983 A1* | 3/2017 | Sebastian | G06T 15/205 |
| | | | 707/707 |

* cited by examiner

ENVIRONMENT INFORMATION STORAGE AND PLAYBACK METHOD, STORAGE AND PLAYBACK SYSTEM AND TERMINAL

CROSS-REFERENCE TO RELATED APPLICATIONS

The present application is a 35 U.S.C. § 371 National Phase conversion of International (PCT) Patent Application No. PCT/CN2017/083695 filed on May 10, 2017, which claims foreign priority of Chinese Patent Application No. 201610613484.6, filed on Jul. 29, 2016 in the State Intellectual Property Office of China, the contents of all of which are hereby incorporated by reference.

TECHNICAL FIELD

The present disclosure relates to a technical field of information technology, and in particular, to an environment information storage and playback method, a storage and playback system, and a storage and playback terminal.

BACKGROUND

In the current era of information explosion, people have access to or generate a wealth of information at all time, and the collection and processing of information have become more and more important in people's lives.

With the improvement of technology, and the development of storage technology and information collection technology, people are increasingly demanding for information collection, and expecting for a more accurate and rich collected information, while the current information collection technology has not yet covered the storage of environment information.

SUMMARY

The present disclosure provides an environment information storage and playback method, a storage and playback system, and a storage and playback terminal, to implement storage of environment information.

In order to solve the above-mentioned technical problem, one technical solution in the present disclosure is to provide an environment information storage and playback method, the storage and playback method may include: acquiring current position data and time data; collecting current environment data; establishing a first association between the environment data and the position data, and establishing a second association between the environment data and the time data; storing the position data, the time data, the environment data, the first association, and the second association into a database; acquiring position information; comparing whether the position information is consistent with the position data in the database; and acquiring the environment data in the database and associated with the position data, when the position information is consistent with the position data.

In order to solve the above-mentioned technical problem, another technical solution in the present disclosure is to provide an environment information storage and playback system, the storage and playback system may include: a collection module configured to acquire current position data, time data, and environment data; an association module configured to establish a first association between the environment data and the position data, and establish a second association between the environment data and the time data; a storage module configured to store the position data, the time data, the environment data, the first association, and the second association; a trigger module configured to acquire position information; a comparison module configured to compare whether the position information is consistent with position data in the storage module after the trigger module acquires the position information; and a playback module configured to acquire the environment data in the storage module and associated with the position data, when a comparison result of the comparison module is that the position information is consistent with the position data.

In order to solve the above-mentioned technical problem, a further technical solution in the present disclosure is to provide an environment information storage and playback terminal, the storage and playback terminal may include: a position sensor configured to acquire current position data; an environment detector configured to collect current environment data; a processor configured to acquire current time data, establish a first association between the environment data and the position data, and establish a second association between the environment data and the time data; and a storage configured to store the position data, the time data, the environment data, the first association, and the second association; the processor further configured to: acquire position information, and compare whether the position information is consistent with the position data in the storage, and acquire the environment data in the storage and associated with the position data, when the position information is consistent with the position data.

The environment information storage and playback method of the disclosure includes: acquiring the current position data and the time data, collecting the current environment data, and establishing the first association between the environment data and the position data and the second association between the environment data and the time data, and storing the position data, the time data, the environment data. The present disclosure respectively establishes associations between the environment information and the position data and between the environment information the time data the first association and the second association, and it can be realized to store the current environment data based on the position and time.

DETAILED DESCRIPTION

Figure 1:
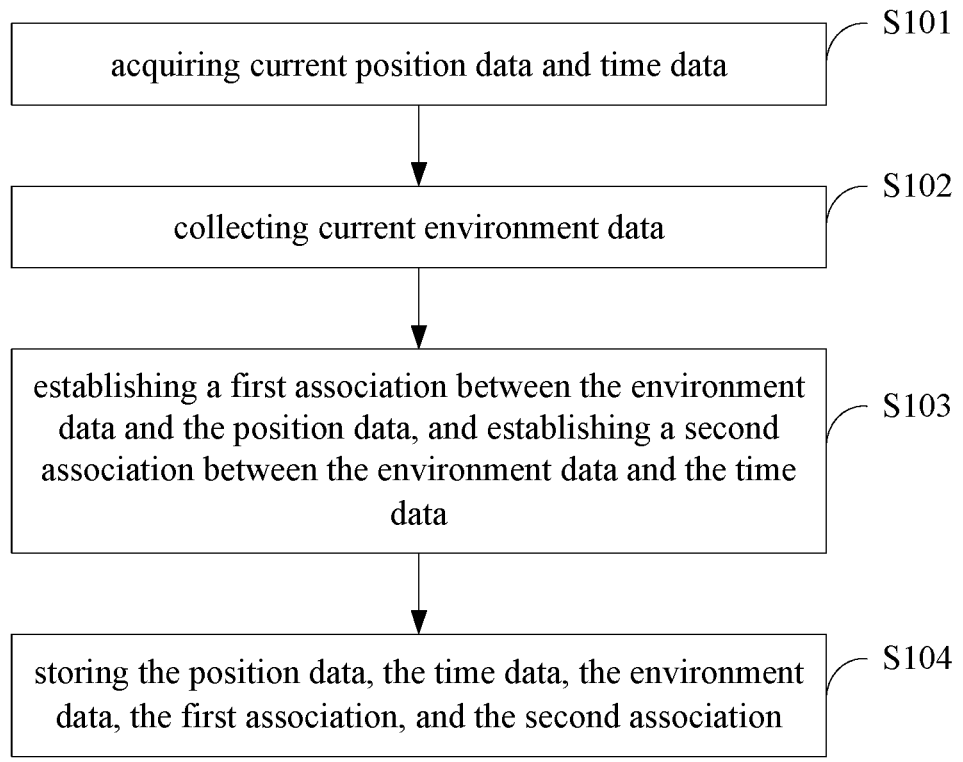
FIG. 1 is a schematic flow chart of an environment information storage method according to an embodiment of the present disclosure.

Referring to FIG. 1, FIG. 1 is a schematic flowchart of an environment information storage method according to an embodiment of the present disclosure. The storage method of the present embodiment may store environment data based on position and time, that is, store the current time and position, and associate environment data with the time and position, so that the environment data could be found according to the time or position, based on the storage method of the environment data.

Specifically, the storage method of the present embodiment may include:

S101, acquiring current position data and time data.

When it is needed to start to collect the environment data, the current position data and time data may be firstly acquired. For the current position, a GPS position service may be adopted to determine the current position, and the position information may be input autonomously. The position data may be latitude and longitude, or may be a street number, a landmark building, etc., in addition to the exact positions listed above, the position data may also be a large area, such as a large business district, an administrative district, or the like.

For the current time data, the system time may be generally regarded as the time data, and the moment that the environment data is started to be collected may be regarded as the time data, or the entire time period in which the environment data is collected may be the time data.

S102, collecting current environment data.

The current environment data may indicate the characteristics of the current environment, which may be the current temperature, humidity, and air quality PM2.5, and may be a recording of the surrounding environment from a photographing device or the like, or a recorded conversation, or a language or written record made by the user.

For the collected environment data, an authority label may be set for the environment data, that is, the search read authority of the data is determined, which relates to the degree of publicity or privacy of the data. Specifically, there may be the following types: it can be public data, which can be searched and read by everyone; it can be searched, but read after permission; or it may be data for a specific user, and can only be searched and read by the specific user; and it may be private data, which cannot be searched and read.

A user may set the authority label autonomously after the environment data is collected. When the user does not perform the setting, it is defaulted that the environment data can be searched and read by everyone.

An index label can also be set for the environment data, and the relevant environment data can be found by searching with the index label. Specifically, there are multiple ways to set the index label. 1) The index label may be set autonomously. After acquiring the environment data, key words/phrases may be inputted to be the index label, for example, when the environment data is the conversation content, the conversation topic may be inputted to be the index label autonomously; and when the environment data is a lecture recording, the lecture topic may be inputted to be the index label autonomously. 2) The environment data may be analyzed to acquire the key attributes of the environment data to be the index label, when the environment data is the shooting record of the environment, the index label can be determined according to the shooting content, such as for shooting of the scenery, shooting of the food, and shooting of sports game, the index labels may be set as scenery, food, games, and so on. In the above two manners, the position time acquired in block S101 can also be used as an index label.

For a single environment data, there may be multiple index labels, and may be independent from and non-repeated with other index labels of the environment data, or may have repeated parts with other index labels of environment data.

S103, establishing a first association between the environment data and the position data, and establishing a second association between the environment data and the time data.

After the block S102 of collecting the environment data has been completed, the first association may be established between the environment data and the position data, and the second association may be established between the environment data with the time data. In another word, equivalently, the position data may be regarded as the first dimension and the time data as the second dimension, to establish a two-dimensional environment data map.

When the index label is not set in the environment data in block S102, the association relationship between the data in the block S103 may be environment data—position data, environment data—time data.

When the index label is set for the environment data in block S102, there may be two types of association relationship between the data in the block S103. One of the two types may be: establishing a first association between the index label of the environment data and the position data, and establishing a second association between the index label of the environment data with the time data, that is, the environment data—the index label—the position data, the environment data—the index label—the time data, in which case, the index label of each environment data is independent and different from other environment data. The other one of the two types may be: establishing the first association between the environment data and the position data, and establishing a second association between the environment data and the time data, that is, the index label—the environment data—the position data, the index label—the environment data—the time data, in which case, the index label of the environment data may have some repeated parts with other environment data.

S104, storing the position data, the time data, the environment data, the first association, and the second association.

The position data, the time data, the environment data, and the relationship among those three in the above blocks may be stored. Before storing, it can be noted that it is needed to encode the collected data and then the encoded data may be stored in a local storage device, or stored in a network accessible cloud storage device, or partially stored in a local storage device and partially stored in the cloud storage device. For example, in block S103, after the first association is established between the index label of the environment data and the position data, and the second association is established between the index label of the environment data and the time data, the position data, the time data, the index label, the first association, and the second association may be stored in the local storage device, while the environment data itself may be stored in the cloud storage device.

The collection, association, and storage of data are implemented in the above blocks S101-S104. In a specific application, data may be continuously collected, associated, and stored. Therefore, for the convenience of the management and storage of data, a database may be established in a logical sense. The database may define the environment data, the position data, the time data, and the association among the data mentioned above. In a logical sense, the collected data may be stored in the database, and the database of the above logical sense may be stored in a physical storage device.

For the above blocks S101-S104, there is no strict sequence, for example, blocks S101 and S102 can be performed simultaneously, that is, the position data, the time data and the environment data may be simultaneously acquired; when starting collecting environment data, block S103 can also be executed to establish the first association and the second association, without waiting until the collection has been completed. Block S104 can also be performed throughout the entire process, that is, the environment data is stored while being collected.

In the storage method of the embodiment, by acquiring the current position data and the time data, collecting the current environment data, and establishing the first association between the environment data and the position data and the second association between the environment data and the time data respectively, and then storing the position data, the time data, the environment data, and the first association and the second association, it may be realized to store the environment data based on the position and time.

Figure 2:
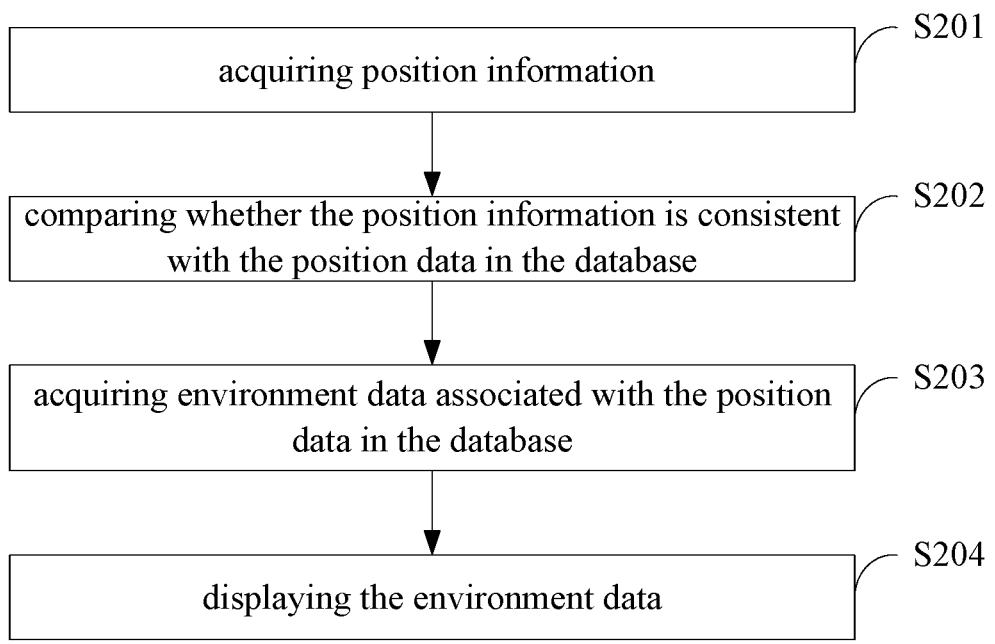
FIG. 2 is a schematic flow chart f an environment information playback method according to an embodiment of the present disclosure.

When the environment data associated with the position and time has been stored in the accessible database, then the data in the database can be read. In the present disclosure, an environment information playback method is also provided. Referring to FIG. 2, FIG. 2 is a schematic flowchart of an environment information playback method according to an embodiment of the present disclosure. The playback method of the present embodiment is to enable a user to play back environment data recorded at a certain position.

Thus, the playback method may include:

S201, acquiring position information.

The position information may be automatically acquired by the positioning system, that is, when the user returns to a certain position, the position information may be automatically acquired, or after the user turns on the playback function, the position information may be automatically acquired. The position information can also be inputted by the user autonomously, that is, when the user needs to view the environment data of a certain position, even when it is not located at the position, the position information can also be inputted to view the environment data of the position.

S202, comparing whether the position information is consistent with the position data in the database.

After acquiring the position information, the position information may be compared with the position data in the database. When those two are consistent, the method proceeds to block S203. Judging the consistency of the position information and the position data in the database does not strictly limit that those two are entirely the same. For example, when the position data of a building is represented by the building name and the building may have multiple names, it is not necessary that the names must be the same when judging, and it is sufficient that those two represent the same position based on the same map.

The environment data associated with the position and time is already stored in the database of the block, and can be accessible. The database can be public, and established by others, or established by the user himself, and the specific establishment of the database may refer to the above-described storage method including the environment information of blocks S101-S104, but is not limited to the above method.

S203, acquiring environment data associated with the position data in the database.

When the position information is consistent with the position data in the database, the environment data associated with the position data may be acquired, and the method may proceed to block S204 to display the environment data.

When the environment data has an authority label, the authority label of the environment data may be to be acquired firstly, and then the environment data may be to get acquired according to the authority label.

When the authority label indicates that the environment data is available to anyone, the environment data may be directly acquired; when the authority label indicates that the environment data is available to some people, the user may be required to provide a license (password, license, etc.) to acquire the environment data; when the authority label indicates that the environment data cannot be acquired by other users, only the person who records the environment data can acquire the data.

For the above manners of acquiring the environment data, the database of the environment data may be public or may be personal but sharable. In addition, for the environment data that only needs to be private data and intended to be viewed by only oneself, the corresponding database may also be a personal database that is not sharable.

In addition, at a certain position, environment data of a plurality of different time is stored, so in this block S203, environment data of all points in time of the position may be acquired; and environment data of a certain point in time or a part of points in time may also be selected.

S204, displaying the environment data.

In this block S204, the acquired environment data may be displayed. When the environment data is a recording record of the surrounding environment, the shooting record is played in block S204. When the environment data is a written record, the written record is displayed in block S204. The displaying environment data may be directly performed after the completion of block S203, or may be performed according to an instruction after completion of block S203.

In the playback method of the environment information, the position information is firstly acquired, and then the position information may be compared with the position data in the database, as the database is stored with the environment data associated with the position and time, when the position information is consistent with the position data, the environment data associated with the position data in the database may be acquired, and then the environment data may be displayed, so as to enable users to play back data that has been recorded at a certain position.

Figure 3:
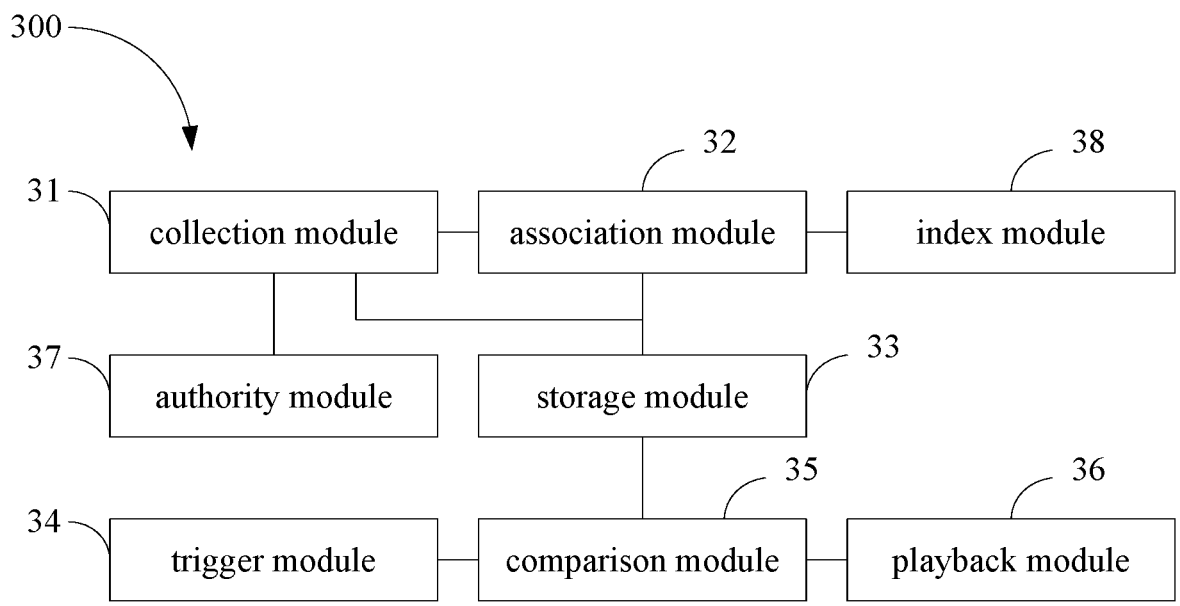
FIG. 3 is a schematic structural diagram of an environment information storage and playback system according to an embodiment of the present disclosure.

The above environment information storage method and playback method are all implemented by a certain system. Referring to FIG. 3, FIG. 3 is a schematic structural diagram an environment information storage and playback system according to an embodiment of the present disclosure. The present embodiment storage and playback system 300 may be capable of storing environment information and triggering playback of environment information by the position.

The system may include a collection module 31 configured to acquire current position data, time data, and environment data. The function of the collection module 31 may correspond to the blocks S101 and S102 in the above storage method, and details are not described herein again.

An association module 32 may be included and configured to establish a first association between the environment data and the position data that are collected by the collection module 31, and establish a second association between the environment data and the time data; the function of the association module 32 may correspond to the block S103 in the above storage method, and details of which are not described again.

A storage module 33 may be connected to the collection module 31 and the association module 32, and configured to store the position data, the time data, the environment data, the first association, and the second association. The function of the storage module 33 may correspond to block S104 in the above storage method, and details will not be described herein again.

The above three modules may be capable of storing environment data based on position and time.

Of course, in order to implement the setting of the authority label and the index label for the environment data, the storage and playback system 300 may further include an authority module 37 and an index module 38.

The authority module 37 may be configured to set an authority label for the environment data collected by the collection module. The function of the authority module 37 may be described specifically in block S103 of the above storage method, and details are not described herein again.

The index module 38 may be configured to set an index label for the environment data, and the function of the index module 38 may also be described specifically in block 103, and thus details are not specifically described herein again.

After the index module 38 sets an index label for the environment data, the association module 32 may also establish a first association between the index label of the environment data and the position data, and establish a second association between the index data of the environment data and the time data.

The storage and playback system 300 may further include a trigger module 34 for acquiring position information. The function of the trigger module 34 may correspond to block S201 in the above playback method, and details are not described herein.

A comparison module 35 may be included and configured to compare whether the position information acquired by the trigger module 34 is consistent with the position data in the storage module 33. The function of the comparison module 35 may correspond to the block S202 in the above playback method, and details are not described herein again.

A playback module 36 may also be included, when the comparison result of the comparison module 35 is that the position information is consistent with the position data, the playback module 36 may acquire the environment data corresponding to the position data in the storage module 33; the function of the comparison module 34 may correspond to the block S202 in the above playback method, and the details will not be described herein again.

The present embodiment storage and playback system 300 may be capable of storing environment data based on position and time, and can trigger playback of the stored environment data with position information.

Figure 4:
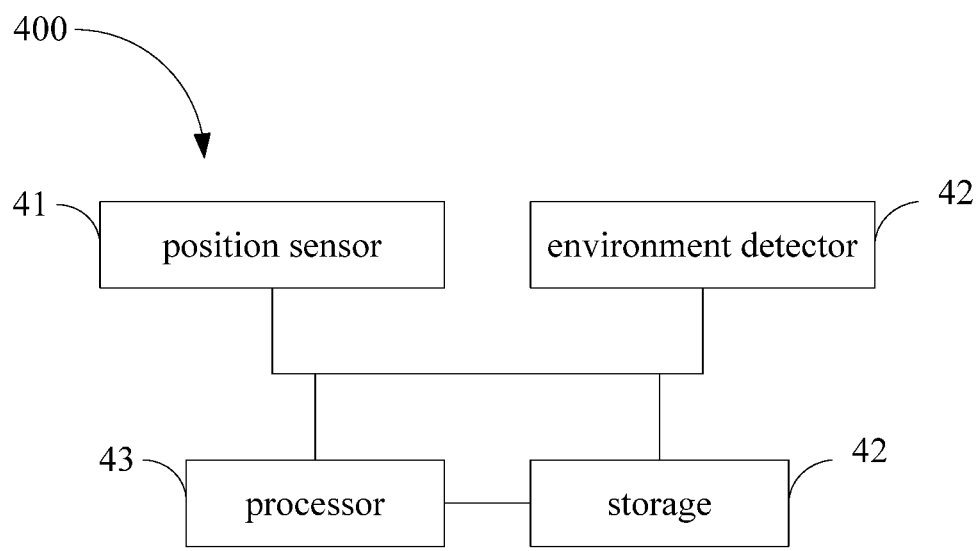
FIG. 4 is a schematic structural diagram of an environment information storage and playback terminal according to an embodiment of the present disclosure.

The above-described storage and playback system 300 describes an apparatus that implements a storage method and a playback method from the perspective of software. In practical applications, it is also necessary to implement software methods based on hardware devices. For details, referring to FIG. 4, FIG. 4 is a schematic structural diagram of an environment information storage and playback terminal according to an embodiment of the present disclosure. The storage and playback terminal 400 of the present embodiment may be a certain terminal, or an assembly of multiple terminals, for example, including a first terminal that implements storage, and a second terminal that implements playback. Specifically, the terminal 400 may include a position sensor 41, an environment detector 42, a processor 43, and storage 44.

The position sensor 41 may be configured to acquire current position data. In general, the position sensor 41 may be a GPS module, which can be integrated on the processor 43 by embedded hardware integration or software coding.

The environment detector 42 may be configured to collect current environment data, and may be a temperature detector, a humidity detector, a lens, a microphone, and the like, and can record current environment data.

The processor 43, a main device for implementing the logic process of the above storage method and the playback method, can acquire time data of the current system time, control the position sensor 41 to acquire current position data, and control the environment detector 42 to collect the environment data.

In addition, the processor 43 can set an authority label, an index label, and the like, for the environment data. Before the data is stored, a first association is established between the environment data and the position data, and a second association is established between the environment data and the time data.

The position data, the time data, the environment data, the first association, and the second association are then stored by the storage 44. The storage and playback terminal 400 can also be connected to the network by the processor 43, and the position data, time data, the environment data, the first association, and the second association can be stored in the cloud storage device on the network.

When the storage and playback terminal 400 is a single terminal, in order to achieve playback of the environment data, the processor 43 may further be capable of acquiring position information. The position information may be sensed by the position sensor 41 or may be inputted by the user, and acquired by processor 43 after automatic sensing or user input.

After acquiring the position information, the processor 43 may compare the position information with the position data in the storage 44. When the position information is consistent with the position data, the environment data corresponding to the position data in the storage 44 may be acquired, and the environment data may be played back.

When the storage and playback terminal 400 is divided into a first terminal and a second terminal, the position sensor 41, the environment detector 42, the processor 43, and the storage 44 may be coexistent in the first terminal to implement storage of environment data.

The second terminal may be configured to the playback of the environment data, and be capable of accessing data in the storage of the first terminal or a cloud database. In the second terminal, a processor and a position sensor may be included. The processor can acquire position information, and the position information can be sensed by the position sensor or inputted by the user, and acquired by processor after automatic sensing or user input.

After acquiring the position information, the processor may compare the position information with the position data in the database. When the position information is consistent with the position data, the environment data corresponding to the position data in the database may be acquired, and the environment data may be played back. The above database may include the storage in the first terminal or a database in the cloud.

The above storage and playback terminal 400 can start storing and playing back according to user's instructions.

The above description depicts merely some exemplary embodiments of the disclosure, but is not meant to limit the scope of the disclosure. Any equivalent structure or flow transformations made according to the disclosure, or any direct or indirect applications of the disclosure on other related fields, shall all fall into the protection scope of the disclosure.

What is claimed is:

1. An environment information storage and playback method by an environment information storage and playback terminal, comprising:
   acquiring current position data and time data;
   collecting current environment data by the environment information storage and playback terminal, based on current environmental characteristics and/or resources provided artificially;
   setting an index label for the environment data by the environment information storage and playback terminal, and/or receiving the index label for the environment data by the environment information storage and playback terminal;
   establishing a first association between the environment data and the position data and establishing a second association between the environment data and the time data, further comprising:
      establishing a first association between the index label of the environment data and the position data, and establishing a second association between the index label of the environment data with the time data, wherein the index label of each environment data is independent and different from other environment data; or
      establishing a direct first association between the environment data and the position data, and establishing a direct second association between the environment data and the time data, wherein the index label of the environment data has repeated parts with other environment data;
   storing the position data, the time data, the environment data, the first association, and the second association into a database;
   acquiring position information;
   comparing whether the position information is consistent with the position data in the database; and
   acquiring the environment data associated with the position data in the database, when the position information is consistent with the position data.

2. The storage and playback method of claim 1, wherein the collecting current environment data further comprises:
   collecting the current environment data and set an authority label for the environment data.

3. The storage and playback method according to claim 2, wherein after the acquiring the environment data associated with the position data in the database, the method further comprises:
   reading the authority label of the environment data, and displaying the environment data according to the authority label.

4. The storage and playback method according to claim 3, wherein in the reading the authority label of the environment data, and displaying the environment data according to the authority label, when the authority label indicates that the environment data is available to anyone, the environment data is directly acquired; when the authority label indicates that the environment data is available to some people, the user is required to provide a license to acquire the environment data; when the authority label indicates that the environment data cannot be acquired by other users, only the user who records the environment data can acquire the data.

5. The storage and playback method according to claim 1, wherein the setting an index label to the environment data further comprises:
   acquiring a key attribute of the environment data to be regarded as the index label.

6. The storage and playback method of claim 1, wherein the storage and playback method further comprises:
   acquiring the position data or position information by a GPS position service or user autonomously inputting.

7. The storage and playback method of claim 1, wherein the environment data comprises a current ambient temperature, a current ambient humidity, a current air quality, or, a video, audio or text, that are currently recorded.

8. The storage and playback method according to claim 1, wherein the time data is a moment that the environment data is started to be collected or an entire time period in which the environment data is collected.

9. The storage and playback method according to claim 1, wherein the storing the position data, the time data, the environment data, the first association, and the second association into a database further comprises:
   encoding the position data, the time data, the environment data, the first association, and the second association, and
   storing the encoded position data, time data, environment data, first association, and second association in a local storage device, or in a network accessible cloud storage device, or partially in the local storage device and partially in the cloud storage device.

10. An environment information storage and playback system, comprising:
    a collection module, configured to acquire current position data, time data, and environment data based on current environmental characteristics and/or resources provided artificially;
    an index module, configured to set an index label for the environment data and/or receive the index label for the environment data;
    an association module, configured to establish a first association between the environment data and the position data, and establish a second association between the environment data and the time data;
    a storage module, configured to store the position data, the time data, the environment data, the first association, and the second association;
    a trigger module, configured to acquire position information;
    a comparison module, configured to compare whether the position information is consistent with the position data in the storage module, after the trigger module acquires the position information; and
    a playback module, configured to acquire the environment data in the storage module and associated with the position data, when a comparison result of the comparison module is that the position information is consistent with the position data;
    wherein the establishing, by the association module, the first association between the environment data and the position data, and establishing, by the association module, the second association between the environment data and the time data, further comprise:
    establishing a first association between the index label of the environment data and the position data, and establishing a second association between the index label of the environment data with the time data, wherein the index label of each environment data is independent and different from other environment data; or
    establishing a direct first association between the environment data and the position data, and establishing a direct second association between the environment data and the time data, wherein the index label of the environment data has repeated parts with other environment data.

11. The storage and playback system of claim 10, wherein the storage and playback system further comprises:
an authority module, configured to set an authority label for the environment data collected by the collection module.

12. The storage and playback system of claim 11, wherein the index module is further configured to acquire a key attribute of the environment data to be regarded as the index label.

13. The storage and playback system of claim 11, wherein the playback module is further configured to read the authority label of the environment data, and display the environment data according to the authority label.

14. An environment information storage and playback terminal, comprising:
a position sensor, configured to acquire current position data;
an environment detector, configured to collect current environment data based on current environmental characteristics and/or resources provided artificially;
a processor, configured to acquire current time data, set an index label for the environment data and/or receive the index label for the environment data, establish a first association between the environment data and the position data, and establish a second association between the environment data and the time data; and
a storage, configured to store the position data, the time data, the environment data, the first association, and the second association;
the processor further configured to: acquire position information, compare whether the position information is consistent with the position data in the storage, and acquire the environment data in the storage and associated with the position data, when the position information is consistent with the position data;
wherein the establishing, by the processor, the first association between the environment data and the position data, and establishing, by the processor, the second association between the environment data and the time data, further comprise:
establishing a first association between the index label of the environment data and the position data, and establishing a second association between the index label of the environment data with the time data, wherein the index label of each environment data is independent and different from other environment data; or
establishing a direct first association between the environment data and the position data, and establishing a direct second association between the environment data and the time data, wherein the index label of the environment data has repeated parts with other environment data.

15. The storage and playback terminal of claim 14, wherein the processor is further configured to set an authority label for the environment data collected by the environment detector.

16. The storage and playback terminal of claim 15, wherein the processor is further configured to read the authority label of the environment data, and display the environment data according to the authority label.

17. The storage and playback terminal of claim 14, wherein the processor is further configured to acquire a key attribute of the environment data to be regarded as the index label.

* * * * *